(12) United States Patent
Sidi et al.

(10) Patent No.: US 8,441,981 B2
(45) Date of Patent: May 14, 2013

(54) EXPLOITING KNOWN RATE MATCHING INFORMATION IN BLIND DECODING OF DOWNLINK WIRELESS DATA TRANSMISSIONS

(75) Inventors: Jonathan Sidi, San Francisco, CA (US); Shantanu Khare, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1064 days.

(21) Appl. No.: 12/031,527

(22) Filed: Feb. 14, 2008

(65) Prior Publication Data

US 2009/0207781 A1 Aug. 20, 2009

(51) Int. Cl.
*H04W 4/00* (2009.01)
(52) U.S. Cl.
USPC .......................................... 370/328
(58) Field of Classification Search .................. None
See application file for complete search history.

(56) References Cited

U.S. PATENT DOCUMENTS

| 7,391,727 | B2 | 6/2008 | Yoon et al. | |
|---|---|---|---|---|
| 2002/0006138 | A1* | 1/2002 | Odenwalder | 370/468 |
| 2006/0059399 | A1* | 3/2006 | Hu et al. | 714/748 |
| 2007/0133579 | A1 | 6/2007 | Kim | |
| 2007/0255994 | A1* | 11/2007 | Michel et al. | 714/751 |
| 2008/0056229 | A1* | 3/2008 | Gholmieh et al. | 370/349 |
| 2009/0003301 | A1* | 1/2009 | Reial et al. | 370/342 |

FOREIGN PATENT DOCUMENTS

| JP | 2006094318 A | 4/2006 |
|---|---|---|
| JP | 2006279311 A | 10/2006 |
| WO | WO0152467 | 7/2001 |
| WO | WO2007041050 A1 | 4/2007 |
| WO | WO2007053840 | 5/2007 |
| WO | WO2007092816 | 8/2007 |

OTHER PUBLICATIONS

"3GPP; TSG RAN: Physical layer procedures (FDD) (Realase7)", 3GPP TS 25.214 V7.7.0 (published Dec. 11, 2007).
International Search Report & Written Opinion—PCT/US2009/033576, International Search Authority—European Patent Office—Jul. 21, 2009.
Mitsubishi Electric (MMCE): "Addition of support for BTFD in flexible position multiplexing of transport channels" 3GPP Draft; R1-041312_25.212CR194, 3rd Generation Partnership Project (3GPP), Mobile Competence Centre; 650, Route Des Lucioles; F-06921 Sophia-Antipolis Cedex; France, vol. RAN WG1, No. Yokohama, Japan; 20041115, Nov. 8, 2004 92004-11-08), XP050099497, p. 17, line 1-p. 22, line 10.
3rd Generation Partnership Project; Technical Specification Group Radio Access Network; "Continuous Connectivity for Packet Data Users," 3GPP TS 25.903, V7.0.0, Mar. 2007, pp. 1-138, URL: http://www.3gpp.org/ftp/Specs/archive/25_series/25.903/25903-700.zip.
Taiwan Search Report—TW098104679—TIPO—Sep. 12, 2012.

\* cited by examiner

*Primary Examiner* — John Blanton
(74) *Attorney, Agent, or Firm* — Stanton Braden

(57) ABSTRACT

In the processing of a data transmission received on wireless data channel HS-DSCH during HS-SCCH-less (HSL) operation according to 3GPP TS 25.214 V7.7.0, a situation is identified wherein redundancy version information corresponding to the received data transmission cannot be obtained from wireless control channel HS-SCCH. The redundancy version information is normally indicative of an HSL redundancy version that specifies derate matching for the received data transmission. In response to identification of the situation, derate matching is applied to the received data transmission according to an HSL redundancy version other than the HSL redundancy version that is specified by HSL for derate matching in the situation.

32 Claims, 3 Drawing Sheets

EXPLOITING KNOWN RATE MATCHING INFORMATION IN BLIND DECODING OF DOWNLINK WIRELESS DATA TRANSMISSIONS

FIELD

The present work relates generally to wireless communication and, more particularly, to downlink wireless communication.

BACKGROUND

The following Technical Specifications are incorporated herein by reference:

"3GPP TS 25.214 V7.7.0 (2007-11)", also known as "3rd Generation Partnership Project; Technical Specification Group Radio Access Network; Physical layer procedures (FDD) (Release 7)" (referred to herein as "TS 25.214"); and "3GPP TS 25.212 V7.7.0 (2007-11)", also known as "3rd Generation Partnership Project; Technical Specification Group Radio Access Network; Multiplexing and channel coding (FDD) (Release 7)".

The document TS 25.214 specifies "HS-SCCH-less" (also referred to as "HSL") operation that targets low throughput applications that utilize HSDPA (High Speed Downlink Packet Access). Examples of applications include Voice over IP (VoIP) communication, and interactive gaming. The HS-SCCH-less feature aims to increase cell capacity in HSDPA operation by reducing signalling overhead normally associated with the control channel known as HS-SCCH (High Speed Shared Control Channel). As its name implies, the HS-SCCH-less feature supports HSDPA operation without the control signalling overhead associated with the use of HS-SCCH.

Normally in HSDPA operation, each downlink data transmission on HS-DSCH is preceded by a corresponding downlink transmission of control information on HS-SCCH. This control information specifies how the UE (user equipment, for example, a cell phone) is to decode the corresponding data transmission. It normally identifies an HS-DSCH transport format. An HS-DSCH transport format (TF) specifies the following parameters: transport block size (physical layer packet size); set of OVSF (Orthogonal Variable Spreading Factor) codes associated with HS-PDSCH (High Speed Physical Downlink Shared Channel); and modulation (e.g., QPSK).

The HSL mode of operation provides for up to three attempts at the physical layer to transmit a given data transport block on the downlink data channel known as HS-DSCH (High Speed Downlink Shared Channel). If a first transmission attempt is unsuccessful, as evidenced by the absence of an expected acknowledgement (ACK) on the uplink from the UE, then a second transmission attempt (i.e., a first retransmission) occurs. If the second transmission attempt is unsuccessful, as evidenced by the absence of an ACK or the presence of a NACK (negative acknowledgment) on the uplink from the UE, then a third transmission attempt (i.e., a second retransmission) occurs. In HSL mode, a given data transmission on HS-DSCH is characterized by any one of (up to) four possible transport formats (TFs).

According to HSL operation, HS-SCCH is not used to transmit control information associated with the first downlink data transmission attempt for a given data transport block. The UE is thus required to decode the data transmission without any control information that specifies how the decoding should be done. This decoding of a data transmission without benefit of associated control information is referred to as blind decoding. For blind decoding of the first downlink data transmission attempt, the UE assumes a given transport format, and performs derate matching (i.e., de-puncturing or de-repeating of bits in the received transport block) according to a redundancy version (RV) that TS 25.214 specifies for the first downlink data transmission attempt. The UE attempts to blind decode the first downlink data transmission using the RV that TS 25.214 specifies for the first downlink data transmission attempt, and up to four (if necessary) transport formats. The document TS 25.214 indicates that the UE will apply this same blind decoding procedure with respect to any downlink data transmission attempt for which no corresponding HS-SCCH control information can be decoded.

It is desirable to provide for improving the success rate of blind decoding at the user equipment.

DETAILED DESCRIPTION

Figure 1:
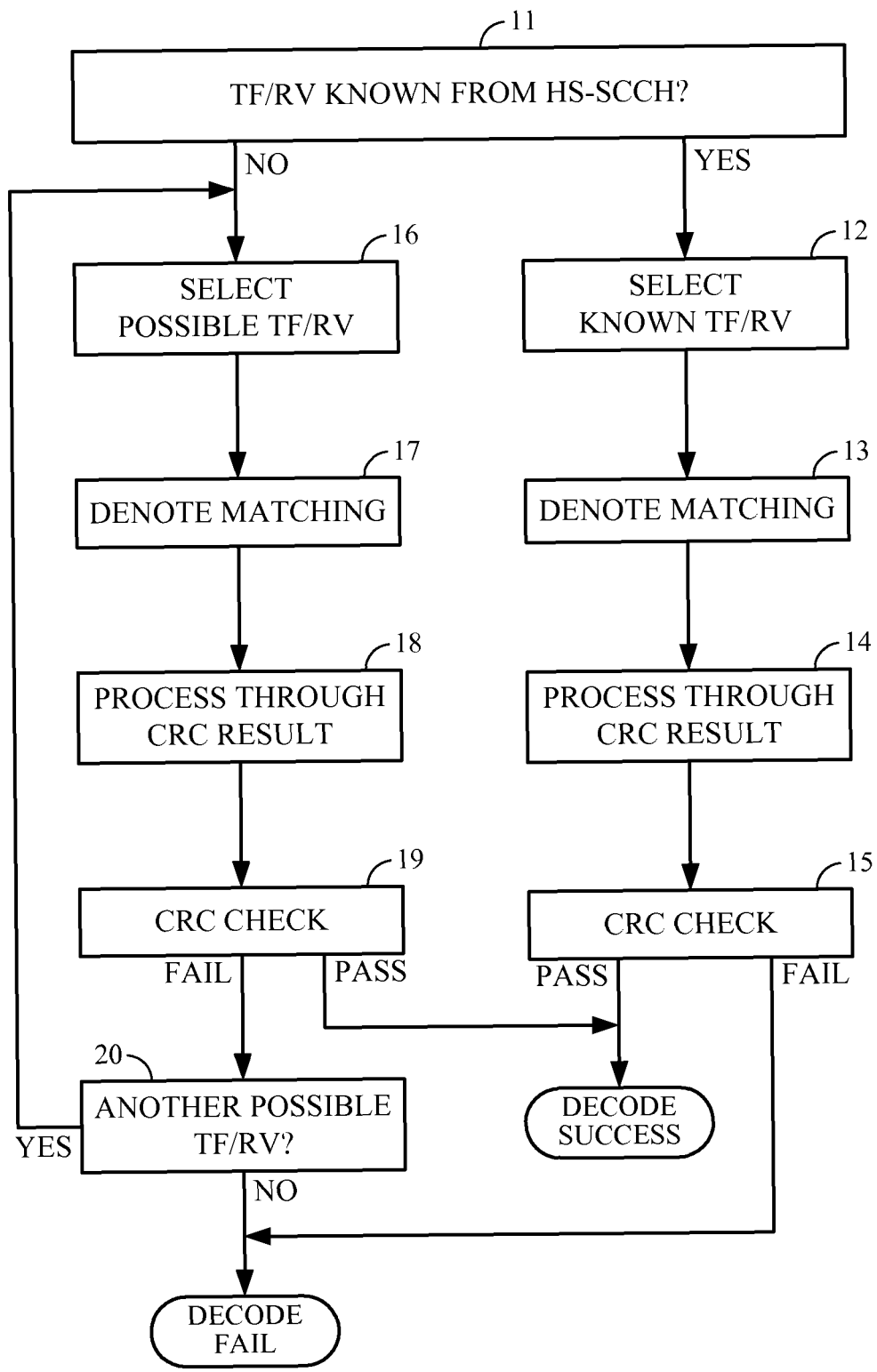
FIG. 1 illustrates operations that may be performed according to exemplary embodiments of the present work.

All embodiments described herein that receive and process control and data and transmissions produced according to TS 25.214 and TS 25.212 are to be understood to encompass products that receive and process control and data transmissions that are produced compatibly with TS 25.214 and TS 25.212, including control and data transmissions produced according to future versions of TS 25.214 and TS 25.212.

The present work exploits the fact that the document TS 25.214 specifies the redundancy versions that are to be used for second and third downlink data transmission attempts (first and second retransmissions) in HSL operation. As mentioned above, if the control information transmitted on HS-SCCH in conjunction with either a first or a second downlink data retransmission is not successfully decoded, TS 25.214 indicates that the user equipment will attempt blind decoding of the retransmission. The present work recognizes that, inasmuch as the redundancy versions assigned to the respective first and second data retransmissions are specified by TS 25.214, the user equipment may advantageously utilize these known redundancy versions when it is necessary to blind decode what is actually a first or second data retransmission (i.e., when the associated control information transmitted on HS-SCCH is not successfully decoded).

A redundancy version fully specifies the rate matching procedure (for a given Transport Format), that is, specifies the position of the bits that are punctured or (less typically) repeated at the transmitter between the coded bits stream and the physical channel bits stream. At the UE, derate matching according to the RV allows depuncturing (i.e. introduction of bits erasures at the correct positions) or, less typically, accumulation of the repeated bits. Typically, each retransmission uses an RV that differs from the one used for the earlier transmission(s) of the same transport block. For HSL operation, the RV sequence for the first transmission and the subsequent two retransmissions is uniquely defined in TS 25.214. Since retransmissions are normally combined with the previous transmissions of the same transport block for decoding, this leads to efficient incremental redundancy gains. A redundancy version that is specified by TS 25.214 for use in HSL operation is also referred to herein as an HSL redundancy version.

For blind decoding of what is actually a first data retransmission, the present work permits the user equipment to use the known redundancy version of that retransmission, in combination with each of the four possible transport formats. Similarly, for blind decoding of what is actually a second data retransmission, the user equipment may use the known redundancy version of that retransmission, in combination with each of the four possible transport formats. The flexibility to use the redundancy version of a given data retransmission enhances the likelihood that the user equipment will be able to blind decode that retransmission successfully, whereas using only the improper redundancy version of the first transmission results (as is done in conventional HSL operation) almost surely in decode failures.

FIG. 1 illustrates operations that may be performed by user equipment receiving downlink communications according to exemplary embodiments of the present work. It is determined at 11 whether the applicable transport format and redundancy version are known from the control information received on HS-SCCH. Any given combination of transport format (TF) and redundancy version (RV) is also referred to herein as TF/RV. If the applicable TF/RV is known at 11, which may be the case for the first and second retransmission attempts when HS-SCCH is successfully decoded, then blind decoding is not required. The known TF/RV is selected at 12, after which derate matching based on the known TF/RV is performed according to conventional techniques at 13. The processing of the downlink data transmission then proceeds according to conventional techniques at 14, ultimately producing a CRC check value. If the CRC check passes at 15, then the decoding of the data transmission is successful. Otherwise, the decoding has failed.

If the TF/RV is not known from HS-SCCH at 11, then blind decoding is required. The TF/RV is never known for the first transmission attempt, and is not known for the first and second retransmission attempts if HS-SCCH decoding fails. If the TF/RV is not known at 11, a first possible TF/RV for the data transmission is selected at 16. Derate matching based on the selected TF/RV is performed according to conventional techniques at 17. The processing of the downlink data transmission then proceeds according to conventional techniques at 18, ultimately producing a CRC check value. If the CRC check passes at 19, then the blind decoding of the data transmission is successful. Otherwise, it is determined at 20 whether there is another possible TF/RV for the data transmission. If so, the next possible TF/RV is selected at 16. The operations at 16-20 are repeated until a CRC check value passes at 19 (indicating that the blind decoding is successful), or until no possible TF/RVs remain at 20. If it is determined at 20 that no possible TF/RVs remain, then the blind decoding of the data transmission has failed.

Figure 2:
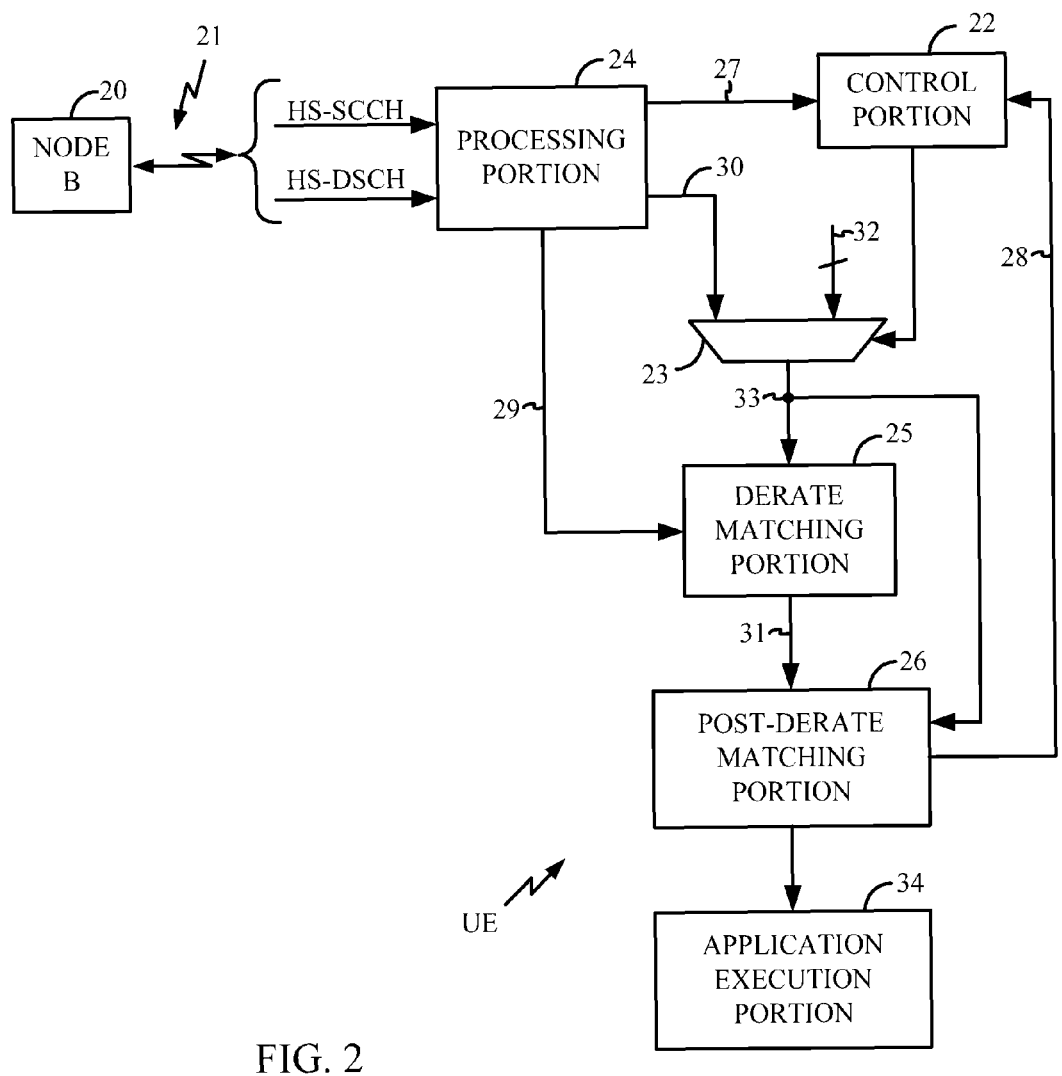
FIG. 2 diagrammatically illustrates a wireless communication system according to exemplary embodiments of the present work.

FIG. 2 diagrammatically illustrates a wireless communication system according to exemplary embodiments of the present work. In some embodiments, the system of FIG. 2 is capable of performing the operations illustrated in FIG. 1. In some embodiments, the user equipment UE of FIG. 2 is capable of receiving and processing downlink communications specified for HSL operation in TS 25.214. In the system of FIG. 2, a base transceiver station 20, referred to as Node B in TS 25.214, uses conventional techniques to transmit downlink communications on HS-SCCH (control information) and HS-DSCH (data) to the user equipment UE via a wireless communication link 21. A first processing portion 24, operating according to conventional techniques, attempts to decode the HS-SCCH transmission and thereby obtain the applicable TF/RV. If the processing portion 24 successfully obtains a TF/RV from HS-SCCH, it provides a signal 27 to indicate that success, and further provides the successfully obtained TF/RV at 30. The processing portion 24, further operating according to conventional techniques, processes the data transmission received on HS-DSCH up to the stage, indicated generally at 29, where rate matching is to be applied.

A control portion 22 is coupled to the processing portion 24 to receive the success indication signal 27. Of course, there will be no success indication at 27 when processing a first downlink transmission during HSL operation, because no TF/RV is transmitted on HS-SCCH. However, TF/RV may be successfully obtained from HS-SCCH when processing a first or second retransmission during HSL operation. If the TF/RV is successfully obtained at 24, blind decoding is not required. In that case, the signal 27 indicates success, and the control portion 22 responds by controlling a selector 23 appropriately to pass the known TF/RV from 30 to a derate matching portion 25 coupled to the output 33 of the selector 23. The derate matching portion 25 is also coupled to the output 29 of the processing portion 24, and uses conventional techniques to perform derate matching according to the TF/RV received from the selector 23.

A post-derate matching portion 26 is coupled to the derate matching portion 25, and processes the output result 31 of the derate matching portion 25 according to conventional techniques, ultimately producing a CRC check value, and evaluating that CRC check value to determine whether the decoding of the data transmission is successful. The post-derate matching portion 26 provides an output signal 28 indicative of whether the decoding of the data transmission on HS-DSCH is successful. The post-derate matching portion 26 also receives the selected TF/RV information from the output 33 of selector 23, and uses the TF information in conventional fashion in its data processing operations.

Referring again to the control portion 22, if the signal 27 indicates no success in obtaining a TF/RV from HS-SCCH, then blind decoding is required. During blind decoding operation, that is, when the signal 27 indicates no success in obtaining a TF/RV from HS-SCCH, the control portion 22 controls the selector 23 appropriately to pass a selected one of a plurality of possible TF/RVs (designated at 32) to the derate matching portion 25. The derate matching portion 25 then performs derate matching according to the selected TF/RV, and passes the result 31 to the post-derate matching portion 26. During blind decoding operation (i.e., with the signal 27 indicating no success in obtaining a TF/RV from HS-SCCH), if the signal 28 indicates no success in decoding the data transmission using the currently selected TF/RV, the control portion 22 controls the selector 23 to pass another selected one of the possible TF/RVs to the derate matching portion 25. The control portion 22 continues controlling the selector 23 appropriately to sequence through the possible TF/RVs at 32 until a selected TF/RV results in a success indication at 28, or until all of the possible TF/RVs have been tried unsuccessfully.

An application execution portion 34 receives from the post-derate matching portion 26 application information contained in successfully decoded data transmissions. The application execution portion 34 uses the application information in the execution of a user application, for example, a VoIP application, an interactive gaming application, etc.

Various embodiments use various sets of possible TF/RVs (see, e.g., 16 and 20 in FIG. 1, and 32 in FIG. 2) for blind decoding. For example, when blind decoding what could be any given one of the three transmissions, some embodiments use all three possible RVs, namely, the RVs that TS 25.214 specifies for the first, second and third transmissions. In such embodiments, a total of twelve TF/RVs are considered as possibilities for use in conjunction with each transmission. Other embodiments use various other sets of possible TF/RVs for the various transmissions.

Some embodiments limit the number of possible TF/RVs, that is, limit the size of the set of possible TF/RVs (see, e.g., 16 and 20 in FIG. 1, and 32 in FIG. 2) based on various considerations. For example, in some typical situations, some of the twelve possible TF/RVs are inapplicable. In TS 25.214, the RV specified for the first retransmission is not self-decodable. With this particular RV, the rate matching procedure at Node B punctures systematic bits first in priority before puncturing parity bits, if needed. Systematic bits are those information data bits passed as is from the channel encoder to its output. Parity bits represent the redundant bits generated for protection by the coder. If systematic bits are punctured at Node B, the UE cannot successfully decode the transport block by itself Rather, it must rely on combining with a previous version of that data transmission for which systematic bits were not punctured. This is normally achieved when receiving a first retransmission for which the control information is received successfully, because the control information contains information relating to the previous (first) transmission whose RV is self-decodable. However, when the UE cannot obtain control information on a first retransmission attempt, that retransmission can only be decoded on its own. When systematic bits are punctured at Node B, this is not possible. In a first retransmission, unless the transport block size of the TF is relatively small, systematic bit puncturing will typically occur at Node B. In some embodiments, all of the four TF/RVs possible for a first retransmission are unconditionally excluded from the set of possible TF/RVs employed by the UE.

Figure 3:
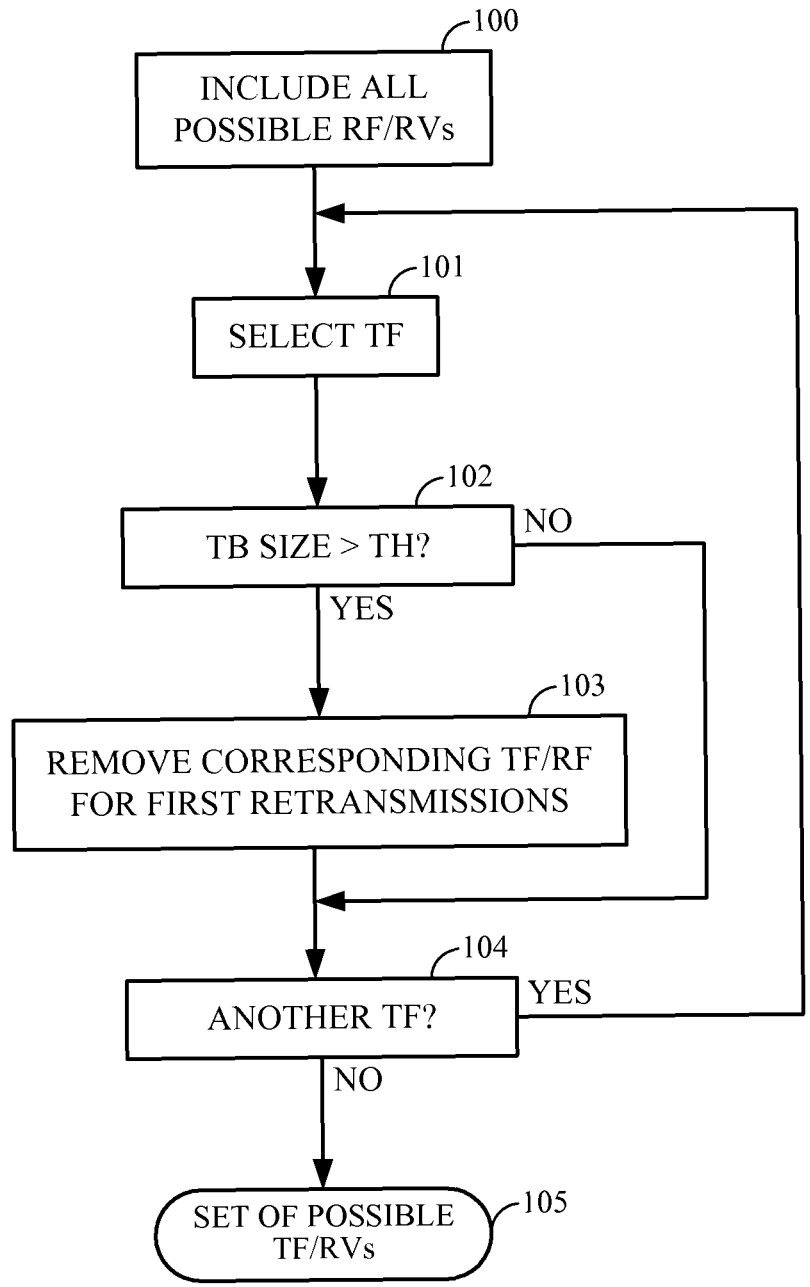
FIG. 3 illustrates operations that may be performed according to exemplary embodiments of the present work.

Some embodiments exclude a TF/RV that is possible for a first retransmission only if the transport block size of the TF exceeds a threshold. Such embodiments recognize that systematic bit puncturing will typically occur at Node B if the transport block size of the TF exceeds the threshold, but will typically not occur if the transport block size does not exceed the threshold. FIG. 3 illustrates exemplary operations that may be used according to such embodiments to define the set of possible TF/RVs (see, e.g., 16 and 20 in FIG. 1, and 32 in FIG. 2) that will be used for blind decoding. As shown at 100, all possible TF/RVs are initially included in the set. One of the four possible transport formats (all of which are known from conventional network provisioning) is selected at 101, and its corresponding transport block (TB) size is compared to a threshold TH at 102. In some embodiments, TH=292 bits. If the transport block size exceeds the threshold TH, it is assumed that systematic bit puncturing will occur during first retransmission rate matching at Node B. Accordingly, the TF/RV that corresponds to first retransmissions and the currently selected transport block size is removed from the set at 103. As seen from 101 and 104, the operations at 102 and 103 are performed for each of the four possible transport formats and their corresponding transport block sizes. The resultant set of possible TF/RVs produced at 105 will be the same as the initial set produced at 100 if none of the four transport block sizes exceeds the threshold at 102. Otherwise, various resultant sets are produced by reducing the initial set by one, two, three, or all four of the TF/RVs associated with first retransmissions, depending on how many of the transport block sizes exceed the threshold at 102.

As will be evident to workers in the art, embodiments such as those described above may be readily implemented in software, hardware, or a combination of software and hardware, for example, by suitably modifying software, hardware or a combination of software and hardware in conventional instances of TS 25.214-compliant user equipment.

Although exemplary embodiments of the invention have been described above in detail, this does not limit the scope of the invention, which can be practiced in a variety of embodiments.

What is claimed is:

1. A method of processing a data transmission received on HS-DSCH during HS-SCCH-less (HSL) operation, comprising:
    identifying a situation during HSL operation wherein redundancy version information corresponding to the received data transmission cannot be obtained from HS-SCCH, said redundancy version information indicative of an HSL redundancy version that specifies derate matching for the received data transmission; and
    in response to said identifying, applying derate matching to the received data transmission according to a first HSL redundancy version other than an HSL redundancy version that is specified by HSL for derate matching in said situation.

2. The method of claim 1, including, in response to said identifying, applying derate matching to the received data transmission according to said specified HSL redundancy version.

3. The method of claim 2, including selecting said first HSL redundancy version and said specified HSL redundancy version from among a set of HSL redundancy versions.

4. The method of claim 3, wherein said set of HSL redundancy versions includes all HSL redundancy versions except a second HSL redundancy version other than said specified HSL redundancy version.

5. The method of claim 4, wherein said second HSL redundancy version specifies rate matching that prioritizes puncturing of systematic bits before puncturing of parity bits.

6. The method of claim 2, including defining said set of HSL redundancy versions based on information indicative of transport block sizes possibly associated with the received data transmission.

7. The method of claim 6, wherein said defining includes excluding a second HSL redundancy version other than said specified HSL redundancy version from said set if all of said transport block sizes exceed a threshold size.

8. The method of claim 1, wherein said situation is one of (1) said redundancy version information is absent from HS-SCCH and (2) said redundancy version information is not decodable from HS-SCCH.

9. An apparatus for processing a data transmission received on HS-DSCH during HSL operation, comprising:
    an input for receiving data transmissions on HS-DSCH, and for receiving control information transmissions on HS-SCCH;
    an input processing portion coupled to said input and configured to identify, and produce an indication of, a situation during HSL operation wherein redundancy version information corresponding to a received data transmission cannot be obtained from HS-SCCH, said redundancy version information indicative of an HSL redundancy version that specifies derate matching for the received data transmission;
    a derate matching portion coupled to said input and configured to apply derate matching to the received data transmission; and a control arrangement coupled to said input processing portion and said derate matching portion, said control arrangement responsive to said indication for controlling said derate matching portion to apply derate matching to the received data transmission according to a first HSL redundancy version other than an HSL redundancy version that is specified by HSL for derate matching in said situation.

10. The apparatus of claim 9, wherein said control arrangement is further responsive to said indication for controlling said derate matching portion to apply derate matching to the received data transmission according to said specified HSL redundancy version.

11. The apparatus of claim 10, wherein said control arrangement includes a selector for selecting said first HSL redundancy version and said specified HSL redundancy version from among a set of HSL redundancy versions.

12. The apparatus of claim 11, wherein said set of HSL redundancy versions includes all HSL redundancy versions except a second HSL redundancy version other than said specified HSL redundancy version.

13. The apparatus of claim 12, wherein said second HSL redundancy version specifies rate matching that prioritizes puncturing of systematic bits before puncturing of parity bits.

14. An apparatus for processing a data transmission received on HS-DSCH during HSL operation, comprising:
   means for identifying a situation during HSL operation wherein redundancy version information corresponding to the received data transmission cannot be obtained from HS-SCCH, said redundancy version information indicative of a an HSL redundancy version that specifies derate matching for the received data transmission; and
   means responsive to identification of said situation for applying derate matching to the received data transmission according to a first HSL redundancy version other than an HSL redundancy version that is specified by HSL for derate matching in said situation.

15. The apparatus of claim 14, including means responsive to identification of said situation for applying derate matching to the received data transmission according to said specified HSL redundancy version.

16. The apparatus of claim 15, including means for selecting said first HSL redundancy version and said specified HSL redundancy version from among a set of HSL redundancy versions.

17. The apparatus of claim 16, wherein said set of HSL redundancy versions includes all HSL redundancy versions except a second HSL redundancy version other than said specified HSL redundancy version.

18. The apparatus of claim 17, wherein said second HSL redundancy version specifies rate matching that prioritizes puncturing of systematic bits before puncturing of parity bits.

19. A wireless communication apparatus for HSL operation, comprising:
   an input for receiving data transmissions on HS-DSCH, and for receiving control information transmissions on HS-SCCH;
   an input processing portion coupled to said input and configured to identify, and produce an indication of, a situation during HSL operation wherein redundancy version information corresponding to a received data transmission cannot be obtained from HS-SCCH, said redundancy version information indicative of an HSL redundancy version that specifies derate matching for the received data transmission;
   a derate matching portion coupled to said input and configured to apply derate matching to the received data transmission;
   a control arrangement coupled to said input processing portion and said derate matching portion, said control arrangement responsive to said indication for controlling said derate matching portion to apply derate matching to the received data transmission according to a first HSL redundancy version other than an HSL redundancy version that is specified by HSL for derate matching in said situation; and
   an application execution portion coupled to said derate matching portion and configured to execute a user application based on application information contained in the received data transmission.

20. The apparatus of claim 19, wherein said control arrangement is further responsive to said indication for controlling said derate matching portion to apply derate matching to the received data transmission according to said specified HSL redundancy version.

21. The apparatus of claim 20, wherein said control arrangement includes a selector for selecting said first HSL redundancy version and said specified HSL redundancy version from among a set of HSL redundancy versions.

22. The apparatus of claim 21, wherein said set of HSL redundancy versions includes all HSL redundancy versions except a second HSL redundancy version other than said specified HSL redundancy version.

23. The apparatus of claim 22, wherein said second HSL redundancy version specifies rate matching that prioritizes puncturing of systematic bits before puncturing of parity bits.

24. The apparatus of claim 19, wherein said user application includes one of a VoIP application and an interactive gaming application.

25. A computer program product, comprising:
   a non-transitory computer-readable medium comprising:
      code for causing at least one computer to identify a situation during HS-SCCH-less (HSL) operation for a data transmission received on HS-DSCH wherein redundancy version information corresponding to the received data transmission cannot be obtained from HS-SCCH, said redundancy version information indicative of an HSL redundancy version that specifies derate matching for the received data transmission; and
      code for causing at least one computer, in response to said identifying, to apply derate matching to the received data transmission according to a first HSL redundancy version other than an HSL redundancy version that is specified by HSL for derate matching in said situation.

26. The computer program product of claim 25, the computer-readable medium further comprising:
   code for causing a computer to, in response to said identifying, apply derate matching to the received data transmission according to said specified HSL redundancy version.

27. The computer program product of claim 26, the computer-readable medium further comprising:
   code for causing a computer to select said first HSL redundancy version and said specified HSL redundancy version from among a set of HSL redundancy versions.

28. The computer program product of claim 27, wherein said set of HSL redundancy versions includes all HSL redundancy versions except a second HSL redundancy version other than said specified HSL redundancy version.

29. The computer program product of claim 28, wherein said second HSL redundancy version specifies rate matching that prioritizes puncturing of systematic bits before puncturing of parity bits.

30. The computer program product of claim 26, the computer-readable medium further comprising:
   code for causing a computer to define set of HSL redundancy versions based on information indicative of transport block sizes possibly associated with the received data transmission.

31. The computer program product of claim 30, wherein the code for causing a computer to define includes code for causing a computer to exclude a second HSL redundancy version other than said specified HSL redundancy version from said set if all of said transport block sizes exceed a threshold size.

32. The computer program product of claim 25, wherein said situation is one of:
   (1) said redundancy version information is absent from HS-SCCH, and
   (2) said redundancy version information is not decodable from HS-SCCH.

\* \* \* \* \*